United States Patent
Von Hollen et al.

[15] 3,697,718
[45] Oct. 10, 1972

[54] METHOD FOR MANUFACTURING WELDED PIPES OR TUBES WITH HELICAL SEAM

[72] Inventors: Dieter Von Hollen; Heinz Holder, both of Dusseldorf-Rath, Germany

[73] Assignee: Mannesmann Aktiengesellschaft, Dusseldorf, Germany

[22] Filed: Feb. 12, 1971

[21] Appl. No.: 115,020

[30] Foreign Application Priority Data

Feb. 13, 1970 Germany..........P 20 07 668.0

[52] U.S. Cl. .....................219/62, 219/8.5, 219/105
[51] Int. Cl. .................................................B23k 1/16
[58] Field of Search.....219/62, 59, 67, 8.5, 102, 104, 219/105

[56] References Cited

UNITED STATES PATENTS

| | | |
|---|---|---|
| 3,470,344 | 9/1969 | Schafer.......................219/62 |
| 2,288,094 | 6/1942 | Karmazin..................219/62 X |
| 1,857,505 | 5/1932 | Heineman................219/105 X |
| 3,300,616 | 1/1967 | Sablotny et al..............219/62 |

Primary Examiner—J. V. Truhe
Assistant Examiner—L. A. Schutzman
Attorney—Smyth, Roston & Pavitt

[57] ABSTRACT

Pipes are made from helically wrapped strips, having one edge uniformly bevelled, the other one roof shaped with h-f heating of the two edges, where one roof side faces the uniform bevel surface. This joint is pressure welded, and the resulting groove is filled by subsequent fusion welding without requiring removal of any burr from the groove.

4 Claims, 5 Drawing Figures

METHOD FOR MANUFACTURING WELDED PIPES OR TUBES WITH HELICAL SEAM

The present invention relates to the method and process for the manufacturing of welded pipes or tubes with a helical seam.

Such pipes are usually produced by paying a strip of metal into a pipe-forming machine that wraps the strip helically around an axis, and adjoining edges of the strip are welded in a helical seam. The welding process usually involves the entire strip and is carried out by pressure welding or fusion welding. It was found, however, that manufacturing of pipes in that manner and from strips having thickness of 8 mm or above, is difficult, as it becomes impossible to provide proper joint with a single welding operation. Therefore, it has been suggested to provide a helical welding seam along the inner helical abutment line of the helically wound or wrapped strip, by fusion welding, but as a preliminary step only, and not in a continuous process. After half a turn of the pipe so made, the welding seam is supplemented by fusion welding along the outer helical abutment line of the strip.

It has also been suggested to provide pressure welding at first, to serve as a preliminary welding step, as preparation for a subsequent fusion welding, particularly now along the inner helical abutment line of the strip. This particular method has the advantage that for fusion welding along the inside path, the concave joint has trough-like configuration, facilitating filling of the joint. However, this method as it has been practiced, has the following disadvantage. For pressure welding the strip edges are inductively heated, and it was found that considerable burrs were formed along the seam on the inside of the pipe. This welding burr had to be removed in a separate operation, prior to fusion welding; such an additional step makes this method quite impossible. Just simply smelting the burr during fusion welding was found to produce inclusions and seam faults to such an extent that the resulting product was quite unusable.

It follows, therefore, that the production of thick-walled pipes with helical seam and final fusion welding step poses the problem that pressure welding as a preparation step must be provided in such a manner that formation of burrs is avoided, at least on that side along which fusion welding is to be carried out. In order to obtain such a result, but within a different context, it has already been suggested to bevel the strip edges differently as it was believed that formation of burrs was avoided in that manner. On the other hand, differently bevelling the strip edges pose problems on its own for the manufacturing of pipes with helical seam as production parameters are influenced by such differences.

The present invention, therefore, seeks to solve the problem, as posed above, and to provide a method which is based on a general principle and is independent from the condition of any particular case of manufacturing. In accordance with the present invention, the heating of the strip edges is to be controlled as to its spatial distribution. The inventive process is an improvement of a process that includes the known step of pressure welding adjoining edges of the reeled strip only along a portion of the helix, and of providing a supplementing fusion welding along the seam portion just made. The invention is characterized particularly by the particular preparation of the edges of the strip, one of them is to be uniformly bevelled while the other one is to be roof-shaped. Due to helically wrapping of the strip, one edge of the paid-in strip is welded to the opposite edge of a portion of the strip that forms already part of the pipe. The joint has helical configuration. As strip paid into the point of wrapping has its one edge approach the edge of strip portions already part of the pipe, one side of the roof-shaped edge will completely face the uniformly bevelled edge. The two edges are heated by h-f for development of thermal energy, predominantly adjacent that one roof side as well as in the region of the acute angle between uniform bevel and the one flat strip surface as facing the one roof side. Predominant heating in this region is due to mutual inductive coupling and skin effect in the acute angle portion of the uniformly bevelled edge. The electrodes are disposed so that the one adjacent the roof-shaped edge is closer to the welding point (for pressure welding) than the electrode disposed adjacent the uniformly bevelled edge. That one roof side is then pressure welded to the uniformly bevelled edge surface adjacent the acute-angled ridge thereof, while the other side of the roof-shaped edge forms a V-shaped groove together with that portion of the uniformly bevelled edge surface which is closer to the obtuse angle thereof with the other flat surface of the strip. The groove has a bottom line about coinciding with the apex of the roof-shaped edge. The non-uniform distribution of developed thermal energy in the edges avoids formation of burr inside of that groove so that it can be filled by fusion welded in a subsequent step without intervening burr removal.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
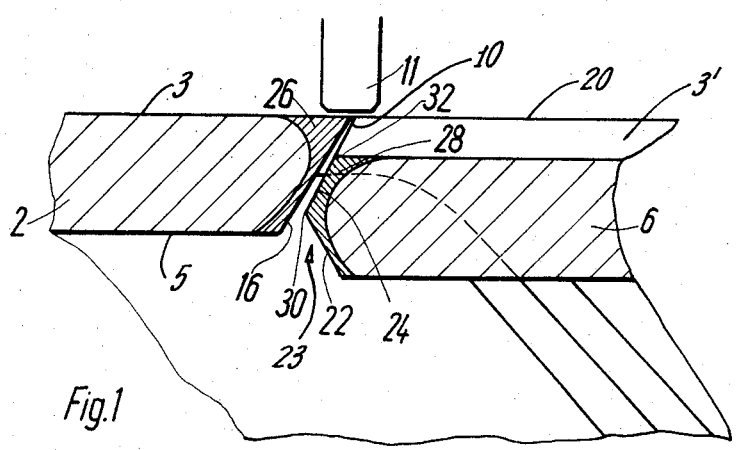
FIG. 1 is a longitudinal section view through a portion of pipe just formed and through paid in strip to be wrapped into a pipe illustrating practicing of the preferred embodiment of the invention.
Figure 2:
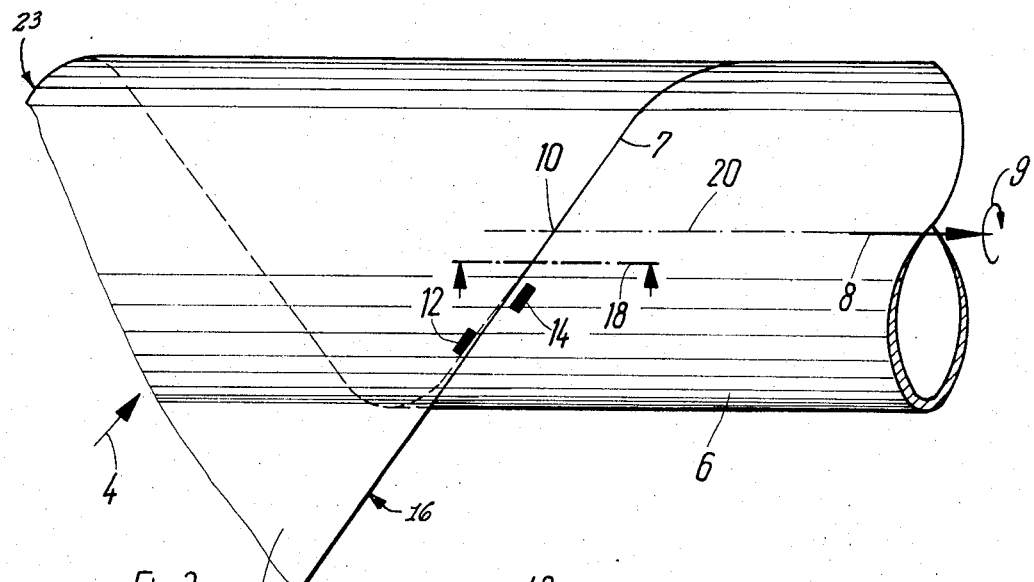
FIG. 2 is a top view of the pipe and strip as shown in FIG. 1.
Figure 3:
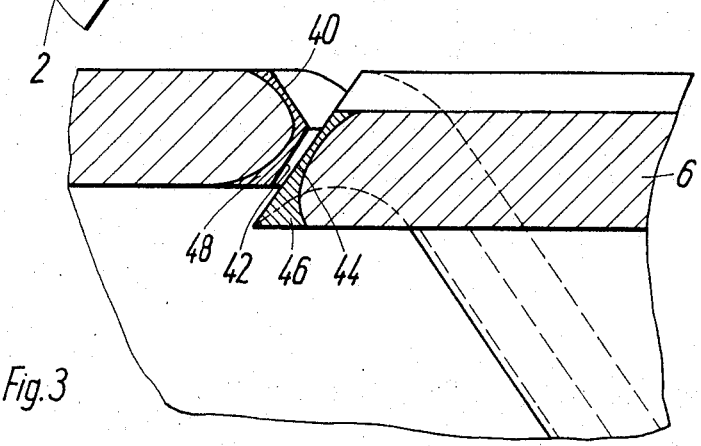
Figure 4:
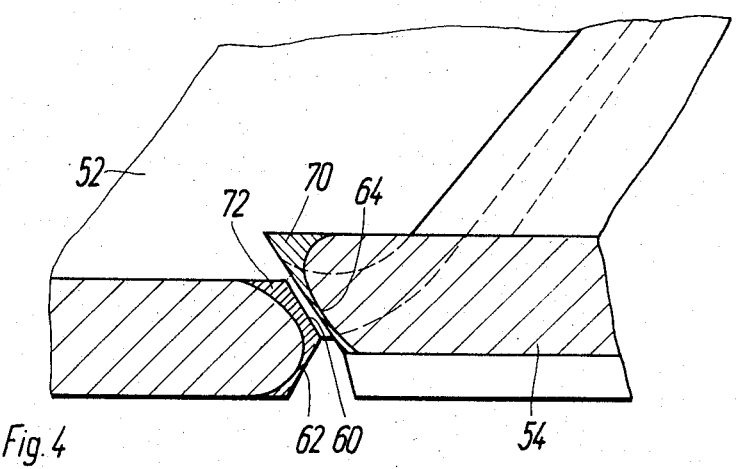
Figure 5:
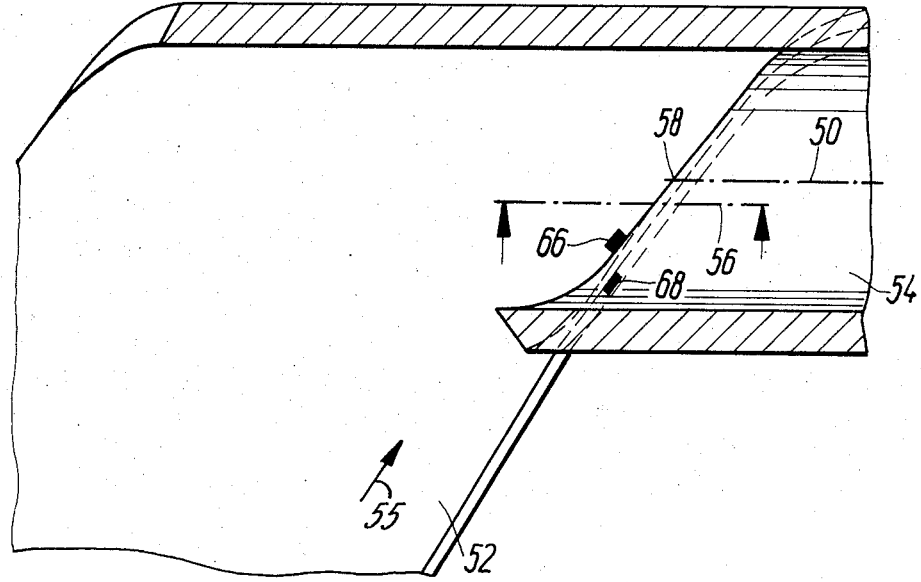

FIG. is a longitudinal section view analogous to FIG. 1, but the edges are formed differently;

FIG. 4 is another longitudinal section view with a different relation between direction of strip pay-in and pipe rotation for withdrawal as compared to FIGS. 1, 2 and 3; and FIG. 5 is a horizontal section elevation of the pipe-strip arrangement shown in FIG. 4.

Proceeding now to the detailed description of the drawings, in the embodiment shown in FIGS. 1 and 2 a metal strip 2 runs in direction of arrow 4 (horizontally) and is wrapped helically around an axis, i.e., bent by means of a suitable strip-bending apparatus (not shown) into a tube or pipe 6 which is withdrawn in the direction of arrow 8 while rotating as indicated by arrow 9. Pursuant to that process, the strip is helically wound and forms a helical joint 7. This joint is to be welded. As can be seen, the upper surface of strip 2 runs tangentially in relation to an (imaginary) apex line 20 of the pipe defining also the line of bending. The intersection of line 20 and of helix 7 defines welding point 10. A pressure roll 11 is provided at this particular spot 10 to obtain welding thereat.

Reference numeral 12 refers to a contact or electrode, engaging strip 2 for providing high frequency current for the purpose of heating. An electrode or contact 14 is disposed on the other side of the developing helix and juncture line, i.e., on the already tubularly bent, pipe defining strip portion. As can be seen, electrode 12 is spaced farther from welding point 10 than electrode 14.

Looking now at strip 2 in particular, it can be seen that the two longitudinal edges thereof have different contour; one edge is uniformly bevelled or chamfered with a bevel surface 16, in that upper surface 3 of the strip has an acute angle with edge surface 16, while the latter has an obtuse angle with lower surface 5 of the strip. The other edge 23 of the strip is roof-shaped, i.e., there is a symmetrical bevel or chamfer from each flat surface, with two roof sides 22 and 24 and a peak line 30 analogous the ridge of a roof.

The orientation is chosen so that the uniformly bevelled edge surface 16 of the strip faces roof-shaped edge 23 of strip portion that pertains to the already formed pipe. The particular view of FIG. 1 is taken in a vertical plane, just before the vertical apex line 20 of the formed tube, so that in that particular plane of FIG. 1 the other edge 23 of the strip is already pertaining to formed tubing, is in a different horizontal level, because, as stated above, the strip 2 runs in direction to be tangential to the top line 20 of the pipe, while the pipe turns up, towards that line. It is, for this reason, that section through the strip that is already part of the pipe, appears to be lower in FIG. 1.

It can readily be seen that upon rotation of pipe 6 (arrow 9) exposed portions of the edge 23 are progressively turned into juxtapositioning with edge surface 16 of the paid-in strip. As that occurs, first a portion of roof side 24 faces edge surface 16, but before alignment of the outer surface 3' or the pipe with strip surface 3, i.e., before alignment of the acute-angled ridge between edge surface 16 and strip surface 3 on one hand, and the edge line 32 of pipe 6 on the other hand. That alignment occurs at welding spot 10. There is then a phase, where all of roof side 24 of an edge portion faces already some portion of edge 16 but prior to reaching the welding spot by both of these portions. It is during that phase, that the two edge portions are being heated.

The contact 13 for providing of h-f current to the uniformly bevelled edge with surface 16 has a distance from welding point 10 which is about the 1.5 fold distance contact 14 has from the welding point. Therefore, the edge of strip 2 adjacent edge surface 16 is preheated along the path between contacts 12 and 14 as the strip moves in direction of arrow 4. The preheating is asymmetrical, as due to skin effect there is concentration of h-f heating current near the acute angle ridge of the bevel at edge surface 16. At and beyond electrode 14, edge 23 is likewise heated. However, only roof side 24 faces already bevel surface 16 everywhere, even though in the section, edge 23 is lower than strip 2 and bevel 16 thereof. Thus, contact 14 is disposed so that strip portions adjoining strip edge surfaces 16 and 24 are heated when the latter fully faces the former. This, of course, is possible because the dimensions of roof side 24 are small, namely about half of a full edge dimension. Therefore, the roof side 24 and bevel edge surface 16 are, in effect, inductively coupled which is instrumental in the concentration and spreading of heating in a region adjacent edge 16, denoted 26. The same is true as far as a heated region 28 along edge 24 is concerned; that heating region or zone is asymmetrical relative to line 30. Consequently, heating will be less intense adjacent that roof apex line 30 than heating along and near outer edge line 32. This is the reason that there is little or no formation of burr along line 30. As the two edges are pressure welded in point 10, all of roof side 24 is welded to the upper portion of edge 16 adjacent heated region 26. Edge 22 and the remainder of bevel edge surface 16 form a V-shaped helical groove along the interior surface of the pipe and is fusion welded.

The FIG. 3 shows the situation in which bevelling is in the reverse, i.e., the strip edge to be welded as a roof-shaped edge or chamfer whereas the opposite edge, as pertaining to the already formed pipe, is uniformly bevelled or chamfered. The two inclined edges of the roof-shaped bevel are denoted with reference numerals 40 and 42, while reference numeral 44 denotes the uniformly bevelled edge of pipe 6. The disposition of the h-f heating electrodes is likewise reversed as the uniformly bevelled edge is to be preheated. Thus, for this case, electrode 14 would be disposed farther away from the welding point than electrode 12, but also here, both electrodes are engaged with strip and pipe from the outside.

The heating regions are denoted with reference numerals 46 and 48 in FIG. 3, and have the illustrated configuration. It should be mentioned, however, that this particular embodiment of FIG. 3 is shown only in principle to demonstrate that there is no basic difference as to which edge is roof-shaped and which one is uniformly bevelled. However, in practice, the arrangement of FIGS. 1 and 2 is preferred, for externally positioned electrodes, adjacent regions of desired heat concentration as less heating current is needed in this case. Moreover, it can be seen that in the embodiment of FIGS. 1 and 2 the V-shaped groove runs on the inside, in FIG. 3 on the outside. Thus, only in the former case can subsequent fusion welding be carried out with the groove forming a concave trough in the inside of the pipe; in FIG. 3, the formed groove is convex as it winds helically around the outside of the pipe.

Proceeding now to the description of the embodiment shown in FIGS. 4 and 5, it can be seen that the strip 52 in this case runs toward and into the lower apex line 50 of the pipe, i.e., the sense of winding and of pipe rotation for withdrawal is reversed. The particular FIG. 5 shows as was stated above, a section view into the formed pipe 54, the upper half of the pipe is cut away for the view. The section line of FIG. 4 is also taken shortly before the apex line 50 as seen in direction of the paid-in strip (arrow 55).

In this particular embodiment, the welding edge of the paid-in strip 52 has a roof-shaped bevel 60 and 62 whereas the respective other edge, as pertaining now to the already formed pipe, is uniformly bevelled at 64.

The electrodes 66 and 68 are disposed on the inside of the pipe whereby electrode or contact 68 on the uniform bevelled edge has a larger distance from the welding point 58 than electrode or contact 66.

Reference numerals 70 and 72 denote the heating regions, and it can be seen that the configuration corresponds to the configuration of the heating regions and zones in FIG. 1. Accordingly, efficiency of current transmissions is similarly favorable. However, with this method, an inside fusion welding with a trough-shaped groove is likewise not possible.

As can be seen in either of the embodiments, there is, on one hand, a uniformly bevelled or chamfered edge facing a roof-shaped edge and, of course, the strip thickness of the material of either edge is uniform so that upon pressure welding there results a V-shaped groove. This groove will be used for fusion welding upon completion of pressure welding. In the embodiment of FIGS. 1 and 2, the V-shaped groove forms along the inside of the tube of the pipe whereas the V-shaped groove in the embodiments of FIGS. 3 through 5 runs along the outside of the pipe. Therefore, fusion welding in FIGS. 1 and 2 is carried out on the inside of the piple while in FIGS. 3, 4 and 5 fusion welding must be carried out along the outside. Only for inside welding can one take advantage of the concave contour of the helical, V-shaped groove establishing a welding trough. In case the strip has the uniformly bevelled edge and the pipe has the roof-shaped bevel, an inside V-shaped groove would result also for the case of FIG. 4 and 5 (as far as feeding into the pipe from below is concerned.

The heating of the edges for purposes of pressure welding by means of conductively transmitted h-f current is carried out so that burr is not formed in the bottom of that V-shaped groove. This is particularly so because at first the uniformly bevelled edge receives welding current. Due to the skin effect, there is heating concentration particularly in the pointed region (26, 46, 70), i.e., in the region having acute angle as between strip surface and edge surface (16, 44, 64). The roof-shaped edge (23 etc.) receives welding current somewhat later and is heated nonuniformly, as the one roof side (24, 42, 60) is inductively coupled to the region of highest current concentration adjacent the respective uniformly and oppositely positioned bevelled edge (16, 44, 64).

During this process, the edge on the already formed pipe rolls into position in relation to the longitudinally paid-in strip. This way, uniformly bevelled edge and roof-shaped edge move relative to each other, and as one side of the roof-shaped edge faces the uniformly bevelled edge, while both edges receive electric heating current, that latter roof-side being likewise subject to heat concentration due to mutual coupling.

It was found, on the other hand, that the material adjacent the apex or peak line (30, etc.) of the roof-shaped bevelled edge remains comparatively cold. The two edges to be joined by means of pressure welding are thus similarly, i.e., in a similar sense, mutually reinforcingly heated but nonuniform as far as each individual edge is concerned, whereby particularly the edge portions in both cases adjacent the roof line which will form the bottom of the V-shaped groove, is heated to a lesser extent, and it is believed that this lack in uniformity is responsible that very little burr is formed adjacent to the peak of the roof.

It follows, therefore, that the particular method has the great advantage that a groove is being formed which does not have to be cleaned and worked otherwise prior to fusion welding, so that the fusion welding can, in fact, be carried out immediately following the pressure welding in a continuous process. The equipment which advances strip and pipe, etc., to obtain pressure welding for an initial and preliminary pipe forming can, therefore, be run at a high speed, corresponding to a high speed for welding. The relative slow filling of the seam, i.e., of the V-shaped groove by means of fuse welding will be carried out with simpler devices.

As can be seen, the invention can be practiced regardless whether the strip runs tangentially from above (FIGS. 1 and 3) or from below (FIGS. 4 and 5) into the strip wrapping and bending equipment, i.e., whether the strip is bent up or bent down. Also, the edge pertaining to the already formed pipe can be uniformly or roof-shaped bevelled, while the edge pertaining to the paid-in strip has the respective other type chamfer. It is apparent, however, that fusion welding cannot be carried out in all cases on the inside of the pipe. In some cases fusion welding has to be carried out on the outside, depending on the chosen combination of edge orientation and relation between direction of strip pay-in and pipe rotation for withdrawal. However, orientation and combination of parameters that results in an inside groove is preferred.

It is basically possible to place the welding electrodes or contacts along inside or outside surfaces, i.e., along edge lines directly participating in pressure welding, or along edge lines on the other side of strip and pipe wall. Different contact and electrode disposition differ basically in the resulting efficiency of current transfer. For example, application of h-f current from the outside of pipe and strip, as shown in FIG. 1, is better for outside pressure welding than for inside pressure welding. (Outside pressure welding results in an inside V-shaped groove and vice versa.) There is, however, no principle difference in resulting current and heating zone distribution along the edges because high frequency heating current using for example, a frequency of 450 Khz, heats by skin effect only, and inductive coupling across facing surfaces is an additional determining factor for the development of current and resistive heating "losses."

The invention is not limited to the embodiments described above but all changes and modifications thereof not constituting departures from the spirit and scope of the invention are intended to be included.

We claim:

1. A method of making pipes by paying metal strip and helically wrapping the strip around an axis and pressure welding adjoining strip edges in a welding point along a helical seam followed by fusion welding the same seam, the improvements comprising the steps of:

preparing the strip along its two, first and second, longitudinal edges, so that the first one is a uniformly bevelled edge, defining an obtuse and acute angle respectively between the edge and the two strip surfaces accordingly, further preparing the strip so that the second edge is roof-shaped with outwardly extending apex line and two angled sides extending therefrom to form obtuse angles with respective strip surfaces, and so that neither of said angled sides complements said bevelled edge;

helically wrapping the strip about an axis at an orientation wherein the first and second edges move toward each other, whereby one side of the roof-shaped edge moves along the uniformly bevelled edge from the obtuse angle towards the acute angle until the first and second edges are aligned, one of the first and second edges pertains to already wrapped strip as forming the pipe to be made, the other one of the first and second edges pertains to paid-in strip to be wrapped, the uniformly bevelled edge adjacent the obtuse angle ridge and the other side of the roof-shaped edge forms V-shaped groove extending helically around the axis, upon completion of wrapping, and high frequency heating both edges along portions where the one side of the second edge has already moved in position relative to the first edge so that the apex of the roof has already cleared the obtuse angle ridge, pressure welding the one side of the roof and the uniformly bevelled edge adjacent its acute angle ridge when aligned, and fusion welding in the V-shaped groove following the high frequency heating and pressure welding.

2. A method as in claim 1, the heating step including preheating the uniformly bevelled edge prior to heating the roof-shaped edge.

3. A method as in claim 2, including the steps of disposing a first welding current electrode adjacent the strip along the first edge at a particular distance from the welding point; and disposing a second welding current electrode adjacent the strip along the second edge at smaller than the particular distance from the welding point, and at a location where the apex of the roof of the second edges faces the first edge.

4. A method as in claim 1, comprising additionally the step of paying the strip paid so that a V-shaped groove forms on the inside of the pipe as between the other roof side and the uniformly bevelled edge surface.

* * * * *